United States Patent [19]

Logan

[11] Patent Number: 4,680,596

[45] Date of Patent: Jul. 14, 1987

[54] METHOD AND APPARATUS FOR CONTROLLING INK-JET COLOR PRINTING HEADS

[75] Inventor: David J. Logan, Glastonbury, Conn.

[73] Assignee: Metromedia Company, Secaucus, N.J.

[21] Appl. No.: 873,079

[22] Filed: Jun. 3, 1986

Related U.S. Application Data

[63] Continuation of Ser. No. 637,143, Aug. 2, 1984, abandoned.

[51] Int. Cl.⁴ .................. G01D 15/18; H04N 1/40; H04N 1/23
[52] U.S. Cl. .................. 346/140 PD; 346/1.1; 358/283; 358/298
[58] Field of Search ............. 346/1, 140 PD; 358/283, 358/298

[56] References Cited

U.S. PATENT DOCUMENTS

| | | | |
|---|---|---|---|
| 3,916,096 | 10/1975 | Everett et al. | 346/1 |
| 3,977,007 | 8/1976 | Berry et al. | 358/298 X |
| 4,032,978 | 6/1977 | Wong | 358/298 X |
| 4,033,443 | 7/1977 | Bunge et al. | 358/283 X |
| 4,084,196 | 4/1978 | Tisue et al. | 358/283 |
| 4,245,258 | 1/1981 | Holladay | 358/283 |
| 4,336,558 | 6/1982 | Lew | 358/283 X |
| 4,339,774 | 7/1982 | Temple | 358/283 |
| 4,340,912 | 7/1982 | Troxel | 358/283 |
| 4,394,662 | 7/1983 | Yoshida et al. | 358/298 X |
| 4,468,706 | 8/1984 | Cahill | 358/283 X |
| 4,566,042 | 1/1986 | Cahill | 358/283 X |
| 4,595,948 | 6/1986 | Itoh et al. | 346/140 PD X |

Primary Examiner—George H. Miller, Jr.
Attorney, Agent, or Firm—McCormick, Paulding & Huber

[57] ABSTRACT

Method and apparatus are provided for controlling a group of ink-jet printing heads to selectively apply (or not apply) dots of one color and of substantially fixed size in random dot pattern arrangements to dot positions of a plurality of pixel areas located sequentially along a line scanned by the printing heads. A sequential series of F integral value color image density signals representative of the tone value at which a respective one of the pixel areas is to be printed by the colored dots is produced. A number of different dot pattern arrangements are listed in a table for the F integral values to produce the tone value representative of a density signal of such an integral value. One of the dot pattern arrangements is randomly selected whenever a color density signal of the integral value appears. The group of ink-jet heads apply colored dots onto the dot positions of the associated pixel area in accordance with the pattern randomly selected.

10 Claims, 4 Drawing Figures

METHOD AND APPARATUS FOR CONTROLLING INK-JET COLOR PRINTING HEADS

This is a continuation of co-pending application Ser. No. 637,143, filed on Aug. 2, 1984, now abandoned.

BACKGROUND OF THE INVENTION

The present invention relates to a method and apparatus for generating halftone colored graphics or displays by applying dots of different colors pixelwise onto a receiving surface, and deals more specifically with the production of polychromatic halftone pixels by applying dots of substantially equal size in random dot patterns to pixel areas of the receiving surface.

The printing or similar generation of halftone colored graphics or displays using variable diameter dots of different primary colors is generally well understood in the printing art. One method commonly used to produce such graphics is that of generating for each of the different primary colors a series of variable diameter dots precisely spaced from one another by a set of screens to print a constant dot placement pattern onto the receiving surface. A printed color reproduction produced by this method generally consists of superimposing the number of different primary colors used of individual images where each of these images varies in density according to the dot size. The saturation (colorfulness) or tone value of a given primary color and density, which is related to the light-reflecting properties of the individual images and is a measure of how dark a color appears, are a function of the percentage area of the receiving surface covered by the dots and are controlled by regulating the size of the dots applied.

The generation of halftone colored graphics using the aforementioned method is generally not practical where dots are applied to dot positions in a matrix format of pixel areas of a receiving surface by ink-jet printing heads nor generally satisfactory in some cases, such as, for example, where the size or diameter of the dot to be applied cannot be varied.

Another problem often encountered with the production of color graphics is the appearance of repeating or moire patterns in the finished halftone color graphic due to the interaction of the dot patterns of the individual screens. Moire patterns also often appear in the finished graphics when dots comprising a halftone of desired hue and saturation level are arranged in the same dot pattern pixel to pixel.

U.S. Pat. No. 4,367,482 to Heinzl, issued Jan. 4, 1983, discloses a method for producing polychromatic halftone images by printing equal sized dots of different primary colors with each color having a fixed, prescribed pattern of dot placement for each saturation level.

The method of producing halftone pixels described by Heinzl is generally unsatisfactory in applications where the recording medium receiving surface may be subject to vibration or other such erratic movement as the medium moves past a dot applying station so that the printing of dots within a pixel and adjacent pixels cannot generally be accurately controlled to produce the desired receiving surface coverage.

It is therefore a general aim of the present invention to provide a method and apparatus for producing polychromatic halftone pixels using ink-jet printing heads to apply color dots of substantially equal size to pixel areas to form color graphics which overcome the limitations and disadvantages of previously used methods and apparatus.

It is a further aim of the present invention to provide a method and apparatus for producing polychromatic halftone pixels which substantially eliminate the appearance of moire patterns in the finished color graphics by applying random dot patterns to adjacent pixel areas so that repetitive dot pattern placement from pixel area to pixel area is unlikely.

Other features and advantages of the present invention will become readily apparent from the following written descriptions and the drawings forming a part thereof.

SUMMARY OF THE INVENTION

The present invention resides in apparatus for controlling an ink-jet printing means to selectively apply (or not apply) dots of one color and of substantially fixed size to a plurality of pixel areas located sequentially along a line scanned by the printing means. Potential dot positions within a pixel area form an array identical for all pixel areas.

In accordance with the invention, a sequential series of image density signals is produced each representing the color tone value desired for a respective one of the pixel areas. The color image density signals may have any of F integral values. A tabular listing means provides, for at least one of the integral values which the density signals may take, a number of different patterns according to which dots may be arranged in the pixel area to produce the related tone value. Another means randomly selects one of said patterns from the tabular listing whenever a density signal of the one integral value appears. A further means operates the ink-jet printing means to apply dots onto the dot positions of the associated pixel area in the selected pattern.

BRIEF DESCRIPTION OF THE DRAWINGS

FIG. 4 is a functional block diagram including the major components of system of FIG. 1.

DETAILED DESCRIPTION

Figure 1:
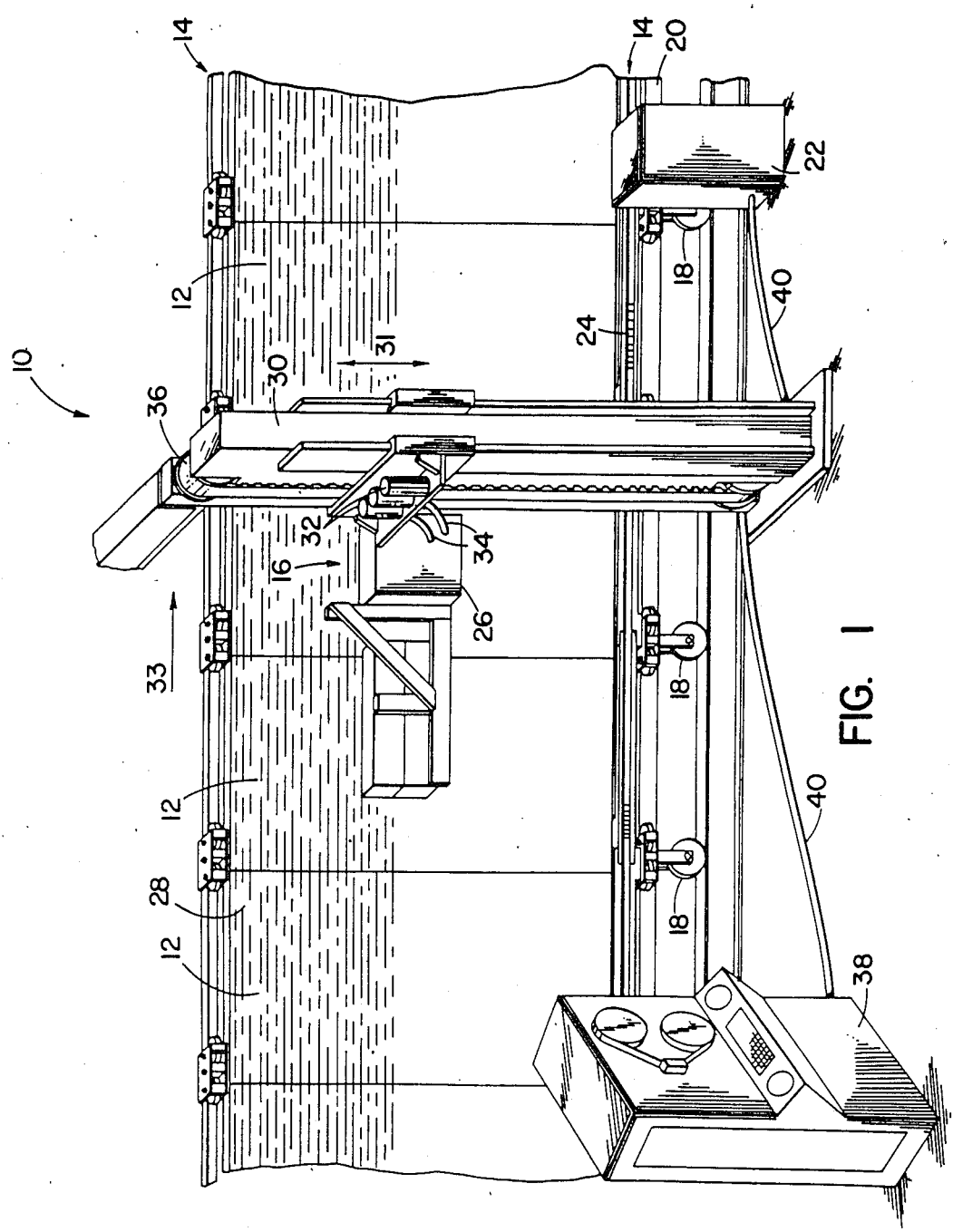
FIG. 1 shows a perspective view of a large-scale sign generating system having apparatus embodying the present invention for producing polychromatic halftone pixels.

Referring now to the drawings, the method and apparatus of the present invention are shown by way of example as embodied in a large-scale sign generating system shown in perspective view in FIG. 1 and designated generally by the numeral 10. Such a system is illustrated and described in the patent application Ser. No. 637,151 filed concurrently herewith in the name of David J. Logan, Kenneth O. Wood, Thomas A. Gordon and John E. Ladue and entitled "Ink Jet Printing System", the disclosure of which application is incorporated herein by reference and to which application reference may be made for further details of its construction.

Briefly, panels 12, 12 collectively providing a receiving surface 28 are mounted on an endless conveyor, designated generally at 14, for movement past a dot applying or printing station 16. The conveyor 14 includes wheels 18, 18 which follow a guide track 20. A drive means 22 has a pinion (not shown) which engages a rack 24 on the conveyor to drive it and the attached panels past the printing station 16 in the direction of the arrow 33.

At the printing station 16, color dot applicator means in the form of an ink-jet printing mechanism 26 is disposed in front of the panels 12, 12 and is driven vertically along an upright supporting column 30 by a driving means 36, as indicated by arrow 31, perpendicular to the direction of movement of the panels. A supply of suitable colored liquids such as, for example, pigmented inks, is provided to the printing mechanism 26 from a number of reservoirs 32, 32 by associated conduits 34, 34.

A computer 38 controls the drive means 36, the drive means 22 and the printing mechanism 26 via a cable 40 and causes the printing mechanism 26 to apply colored dots to the receiving surface 28 to produce a desired colored sign or other display.

The sign or display colors are produced by the well known three-color printing process. The colors cyan, magenta and yellow result directly from the printing of those pigmented inks. The colors red, blue, green and black result from the overlay of the pigmented inks with red being produced from magenta and yellow; green from cyan and yellow; blue from magenta and cyan, and black from the overlay of all three. The other colors are produced by various combinations of the colors cyan, magenta, yellow and the background color of the receiving surface. Although the color black is producible as described above, it is preferrable to produce the desired colors using the four-color printing process with black being the fourth color. Reference may be made to any number of textbooks on color theory such as, for example, J.A.C. Yule, Principles of Color Reproduction, (1967) for a more detailed explanation of color generation the text of which is incorporated herein by reference.

In the system 10 shown of FIG. 1, the receiving surface 28 moves in a continuous motion past the printing station 16 while the printing mechanism 26 remains vertically stationary, and the printing mechanism is operated to print dots which appear on a line, or more precisely within a narrow band, extending horizontally or parallel to the direction of movement of the receiving surface. In accordance with the invention, and as explained in more detail below, the printing of the dots is controlled in a pixelwise manner wherein the printed line or band is taken to consist of a series of side-by-side pixels or small discrete areas of the receiving surface. At the completion of the printing of a line, the printing mechanism 26 moves downwardly a distance equal to the height of the line and the next line is then printed immediately adjacent to the previous one. A large number of such side-by-side lines form the finished sign or other display.

Figure 2:
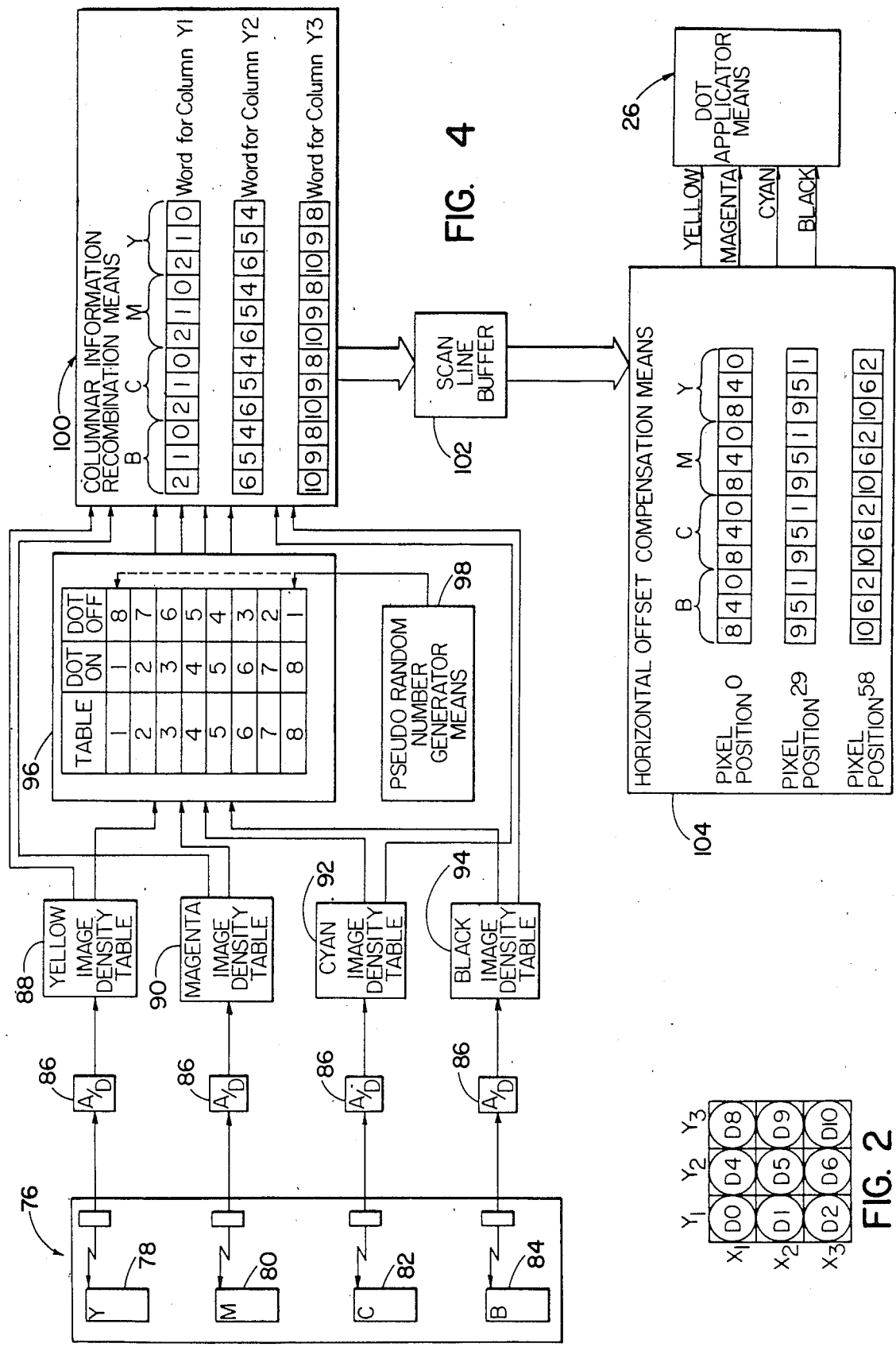
FIG. 2 is an illustration of a pixel of the type associated with the system of FIG. 1.

Referring to FIG. 2, a pixel of the type associated with the invention is made up of a plurality of dot positions in a matrix having "X" number of rows and "Y" number of columns, where each row is made up of "Y" dot positions and each column is made up of "X" dot positions where "X" and "Y" are integers.

The number of saturation levels or tone values of a pixel, for each color, is set by the number of dot positions in the pixel and the number of positions printed corresponds to the magnitude of a measured color image density as described in more detail in the discussion of FIG. 4 below. For example, the lowest color image density level may correspond to none of the dot positions being printed and the highest density level correspond to all of the dot positions being printed with intermediate density levels each having a proportional number of dot positions printed. Thus, the number of saturation levels of a color in a pixel may be expressed as $[(X*Y)+1]$ where X and Y are the number of rows and columns respectively.

In one actual construction of the system of FIG. 1, a pixel is made up of a 3×3 matrix; that is, each row contains three dot positions and each column contains three dot positions to form a pixel having nine dot positions and able to provide ten density levels.

Each pixel is about 1/10 inch by 1/10 inch in size making each square of the matrix have sides 0.033 inches long. A circle centered on the center of each square and having a diameter equal to one side of the square is taken to be a "dot position". The diameter of the colored dot applied to a dot position is made slightly larger than 0.033 inches, for example 0.035 inches, to maximize coverage of the receiving surface between the adjacent dot positions.

Figure 3:
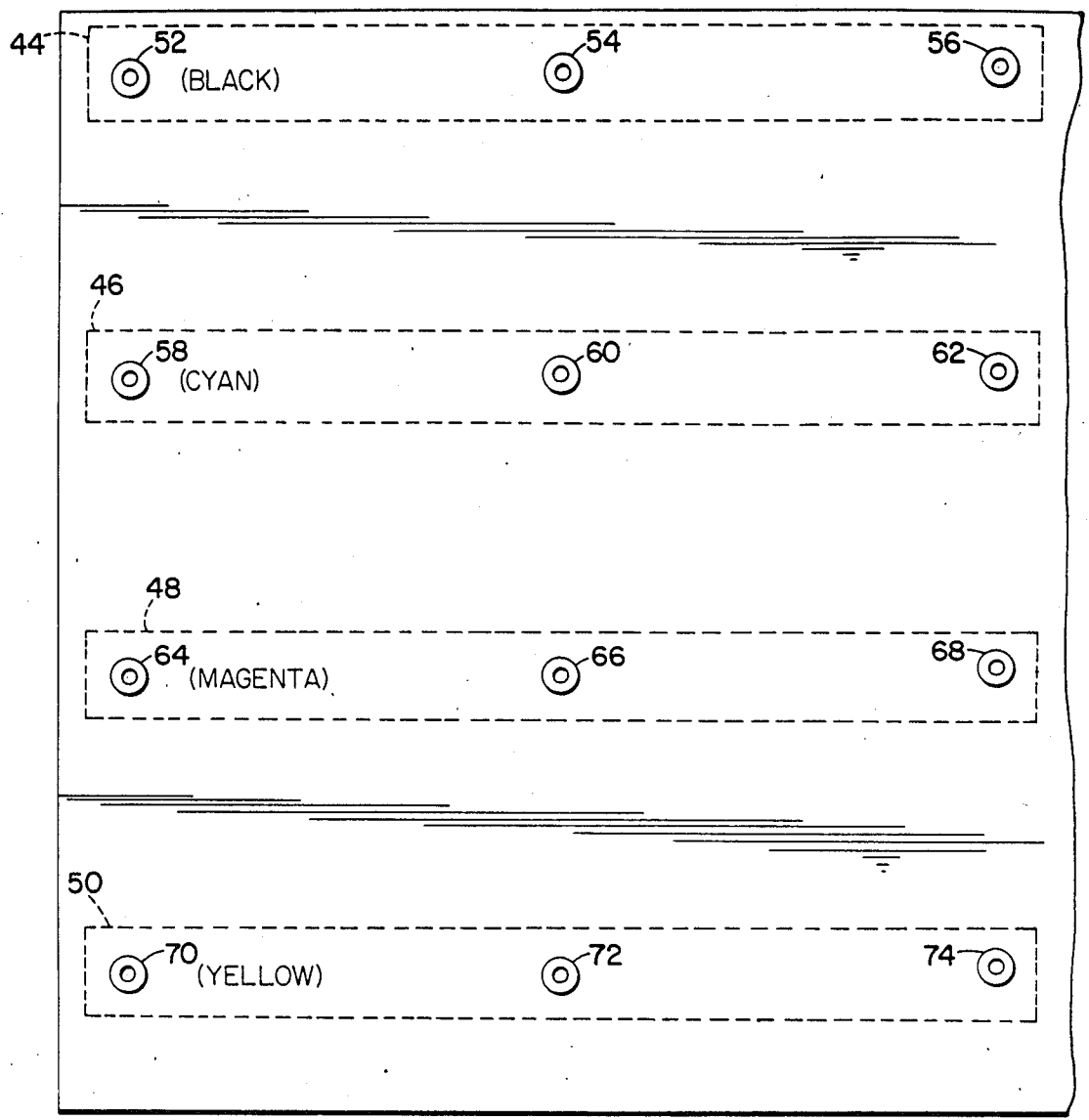
FIG. 3 is a schematic front view of the dot applicator of FIG. 1 showing the arrangement of its ink-jet printing heads.

Referring to FIG. 3, a schematic front view of the color dot applicator means 26 which is used with the sign generating system 10 embodying the present invention is shown therein. The dot applicator 26 is comprised of four groups 44, 46, 48 and 50 of ink-jet printing heads and associated nozzles 52 to 74 for the four colors black, cyan, magenta and yellow, respectively. Each group is comprised of three ink-jet printing heads arranged side-by-side with each head being horizontally spaced from its neighboring head or heads of the group by an equal distance. Each printing head in a group is also vertically offset from its neighbors by a distance equal to the diameter of a dot position, so that a line passing through the centers of the printing head nozzles of a group is slightly inclined. The arrangement of ink-jet printing head nozzles 52 to 74 of the dot applicator means 26 shown in FIG. 3 is such that nozzles 56, 62, 68 and 74 apply dots to dot positions D0, D4, D8 of the pixel illustrated in FIG. 2; nozzles 54, 60, 66 and 72 apply dots to dot positions D1, D5, D9 and nozzles 52, 58, 64 and 70 apply dots to dot positions D2, D6, D10 respectively. Thus, a row of dots in a pixel is printed by a corresponding one ink-jet nozzle of a group as the receiving surface moves horizontally relative to the nozzle and a column of dots is printed by all the ink-jet nozzles of a group.

Still referring to FIG. 3, the four color groups 44, 46, 48 and 50 are arranged vertically with each group being spaced from its neighboring group or groups by an equal distance. A two inch vertical spacing between groups permits twenty lines of a given color to be printed before a line of the next adjacent color group is printed. The twenty line delay provides drying time for a color before it is overprinted.

Further considering the dot applicator 26 of FIG. 3, it would be desireable to vertically stack the ink-jet heads of a group so that the distance between neighboring ink-jet nozzles is equal to the diameter of a dot position. Such a vertical stacking arrangement would allow the nozzles of a group to apply dots to the dot positions of a pixel column when all the ink-jet heads are operated at the same time. However, the size of the ink-jet printing head imposes physical mounting constraints requiring horizontal and vertical spacing between neighboring heads to accommodate mounting and placement on the dot applicator mechanism 26. In the embodiment of the dot applicator of FIG. 3, neighboring ink-jet printing head nozzles of a group are horizontally spaced 2.9 inches apart. The dots applied to dot positions of a given column for a given pixel when all the printing heads of a group are operated at the same time absent compensation for spacing are consequently printed at a spacing relative to a first dot printed in the column of 2.9 and 5.8 inches from the first dot rather than vertically in a column above and below one another.

As explained in greater detail hereinbelow, and in connection with the discussion of FIG. 4, data words representing columnar information for a given pixel are reconstructed to compensate for the horizontal offset of the printing heads. For example, if all the ink-jet printing heads for a given color group are operated at the same time, one dot is printed in dot position X1Y1 of a pixel area being printed at a first pixel position on the receiving surface; one dot is printed in dot position X2Y1 of a pixel area being printed at a pixel position 2.9 inches or 29 pixel positions away from the first pixel position and one dot is printed in dot position X3Y1 of a pixel area being printed at a pixel position 5.8 inches or 58 pixel positions away from the first pixel position. After the receiving surface has moved past the dot applying station 16 a distance equal to the diameter of a dot position, the ink-jet printing heads are operated and a dot is applied in dot position X1Y2 of the pixel being printed at the first pixel position; one dot is printed in dot position X2Y2 of the pixel being printed at a pixel position 29 pixel positions away from the first pixel position and one dot is printed in dot position X3Y2 of the pixel being printed at a pixel position 58 pixel positions away from the first pixel position. The receiving surface is again moved a distance equal to a dot position and the ink-jet heads are operated to print a dot in dot positions X1Y3 of the first pixel position, X2Y3 of the pixel being printed at pixel position 29 and X3Y3 of the pixel being printed at pixel position 58. It will be seen that the receiving surface is moved a distance of 5.8 inches to fully print a given pixel area.

Turning now to FIG. 4, a block diagram partially in schematic form of the major components of the system of FIG. 1 are shown therein. The color image density information necessary to produce a color reproduction may be obtained in any of a number of ways known in the art. As shown in FIG. 4, a scanner indicated generally at 76 is used to determine the image density level of a given color by scanning a separation negative of the corresponding given color which has been suitably produced in a separate process. The separation negatives represent the image density level for the colors yellow, magenta, cyan and black and are indicated within the scanner 76 at 78, 80, 82 and 84, respectively. The scanner 76 operates in a conventional manner wherein a beam of light shines through a separation negative and generates an analog electrical signal representative of the color density at the scanning point. The analog signal is then transmitted to an analog-to-digital converter 86, 86 where the measured analog signal is converted to a digital signal.

In the present embodiment, the analog signal may be converted to one of 256 discrete values with 0 corresponding to no light passing through a separation negative at the scanning point and 255 corresponding to maximum light passing through a negative. The converted digital signal is then fed to a PROM look-up table 88, 90, 92 or 94 for the colors yellow, magenta, cyan and black, respectively to convert it to an image density signal. The image density signal may have any one of F integral values each representing the number of dots (of one color) needed in a matrix pixel to produce a corresponding measured image density. An image density signal from the look-up tables 88, 90, 92, 94 is fed to a tabular listing functional block 96 to select one of the tabular listings or tables contained within the tabular listing functional block corresponding to a one of the F integral values of the image density signal.

Tables are contained in function block 96 which represent the various combinations of dots on and dots off in a matrix pixel for one dot on, two dots on, three dots on and four dots on, and so forth through eight dots on. It will be seen that only four tables are needed to represent the various combinations of dots on and dots off if the tables representing one dot on through four dots on are complemented so that the complement of the four dots on table generates five dots on, the complement of the three dots on table generates six dots on and so forth. A dot is said to be on when its associated dot position is to be printed. The combinations of no dots printed and all dots printed are considered to be trivial and do not require a look-up table.

For example, a given image density signal may indicate that two dot positions are to be printed within a pixel to produce a corresponding measured image density of a given color. A table is selected from function block 96 corresponding to two dots being printed and seven dots being left blank. The table selected contains a listing of all the possible patterns according to which two dots may be printed within a nine dot pixel.

Each table within block 96 contains a plurality of nine bit words, each word being representative of one of a possible number of matrix pixel dot pattern configurations and each nine bit word listed in a dot pattern configuration table in block 96 is assigned a number. A pseudo-random generator means indicated at 98 provides a random number which is used as a table pointer to select one of the numbered nine bit words representative of one of the possible pixel dot pattern configurations stored in the table for the corresponding image density unless the density value is zero or nine in which case none of the tables are selected and the output from the image density table 88, 90, 92, or 94 is fed directly to a columnar information recombination means functional block 100 which is part of the computer 38. One word is so randomly chosen unless the density is zero or nine for each color so that four words are selected. The selected nine bit word for each color is outputted from an associated dot pattern table contained in block 96 to the columnar information recombination means 100. The recombination means 100 reforms the four nine bit words into new twelve bit words. Each new twelve bit word (three bits per byte, one byte for each of the four colors) is associated with a column Y1, Y2, Y3 of a matrix pixel and each bit position contains information indicating whether or not a dot of the color represented by that bit position is to be printed. The recombination means 100 contains three twelve bit words for the three column by three row matrix pixel used in the embodiment described herein.

The output of the recombination means 100 is fed to a scan line buffer memory 102 which stores sequentially a plurality of the twelve bit reformed words each containing the color information for an associated pixel column. Preferably, twenty lines of color information for each color are stored in the buffer means 102 to accommodate the two inch vertical spacing between color groups 44, 46, 48, 50 of the dot applicator means 26 as illustrated in FIG. 3.

As explained hereinabove, the ink-jet printing heads 5 for a given color group are not in vertical alignment but are rather spaced laterally. Still referring to FIG. 4, the twelve bit words containing the columnar dot printing information for each color in a given pixel is retrieved from the scan line buffer memory 102 by a horizontal offset compensation means 104, which is part of the computer 38, in such a way as to compensate for the lateral spacing of the ink-jet printing heads. Each new twelve bit word (3 bits per byte, one byte for each of the four colors) produced by the horizontal offset means 104 is associated with a row X1, X2, X3 of a matrix pixel and each bit position contains information indicating whether or not a dot of the color represented by that bit position is to be printed. The twelve bit words are used to control the operation the ink-jet printing heads in a color group to apply dots to dot positions in three different pixel positions as explained hereinabove to compensate for the vertical and horizontal spacing between ink-jet printing heads in the color group. For example, for a given color group one word contains control information to operate the top printing head of a group to print row X1 in pixel position 0, a second word contains control information for the middle printing head of the group to print row X2 in pixel position 29, and a third word contains control information for the bottom printing head of the group to print row X3 in pixel position 58. Therefore, the dot pattern information for a given color is offset laterally 87 and 174 dots (29 and 58 pixel positions) respectively from a dot printed by the top ink-jet printing head nozzle of a group so that all printing heads operate simultaneously to apply dots onto the receiving surface to form the desired display.

Apparatus for controlling a group of ink-jet printing heads to produce polychromatic halftone pixels by applying dots of substantially equal size in random dot patterns to pixel areas of a receiving surface to generate color graphics wherein the appearance of morie patterns is substantially eliminated has been described in a preferred embodiment. It will be understood that numerous modifications and substitutions, such as, for example, the number of different primary colors used to produce a color of desired hue and saturation or the number of dot positions comprising a pixel area may be made without departing from the spirit of the invention. Therefore, the invention has been described by way of illustration rather than limitation.

I claim:

1. Apparatus for controlling an ink-jet printing means in a large scale graphic system to apply dots of one color and of substantially fixed size to a plurality of pixel areas located sequentially along a line scanned by said printing means and within each of which pixel areas, potential dot positions form an array identical for all pixel areas, said apparatus comprising:

means for producing a sequential series of image density signals each representative of the color tone value at which a respective one of said pixel areas is to be printed by dots of said one color, said density signals having any one of F integral values;

means for providing, for at least one of said integral values which said density signals may take, a tabular listing of a number of different patterns according to which dots may be arranged in a pixel area to produce the tone value corresponding to said one integral value;

means for randomly selecting a different one of said patterns from said tabular listing whenever a density signal of said one integral value appears, and means for operating said ink-jet printing means to apply dots in a pattern randomly selected from said tabular listing onto the dot positions of the associated pixel are in the sequence of pixel areas to be printed, each of said dot positions comprising a pixel area being available to receive a dot and being printed when a corresponding dot comprising the random pattern is to be printed in the dot position, wherein the pattern of an immediately adjacent advance pixel area is randomly selected from the tabular listing and the pattern of an immediately adjacent trailing pixel area in the sequence is randomly selected from the tabular listing, each of said immediately adjacent pixel areas in a sequence of pixel areas for a given integral value being printed with a different randomly selected pattern.

2. Apparatus for controlling an ink-jet printing means as defined in claim 1 wherein the potential dot position array for each pixel area is one where the dot positions are arranged by columns and rows.

3. Apparatus for controlling an ink-jet printing means as defined in claim 2 wherein said ink-jet means has a number of ink-jet heads equal to the number of dot positions in each column.

4. Apparatus for controlling an ink-jet printing means as defined in claim 2 wherein said F integral value range between 1 and $[(x*y)+1)]$ where x represents the number of said rows and y represents the number of said columns.

5. Apparatus for controlling a group of ink-jet printing means as defined in claim 1 wherein a tabular listing of all possible dot patterns is provided for each of the F integral values other than the one representing the printing of no dots and the one representing the printing of all dots.

6. Apparatus for controlling an ink-jet printing means as defined in claim 1 further characterized by the printing of at least one other color with the same randomizing means being used to select a different one of said patterns from said tabular listing for each of the pixel areas to be printed by said other color.

7. Apparatus for controlling an ink-jet printing means as defined in claim 1 wherein said means for providing said dot pattern tabular listing includes memory means having a plurality of addessable storage locations, each storage location containing one of the number of the different dot pattern arrangements being represented as a binary coded digital word with each bit position of the word corresponding to one of the dot positions of a pixel area.

8. Apparatus for controlling an ink-jet printing means as defined in claim 7 wherein said random selection means includes means for randomly generating a plurality of numbers each associated with one of said memory means addressable storage locations and means for selecting a said one storage location corresponding to a said one random number.

9. A method for controlling an ink-jet printing means in a large scale graphic system for applying dots of one color to a plurality of pixel areas located sequentially along a line scanned by said printing means, said method comprising the steps of:

(a) producing a sequential series of image density signals each representative of the tone value at which a respective one of said pixel areas is to be printed by dots of said one color, said density signals having any one of F integral values;

(b) providing an addressable lookup table, for at least one of said integral values which said density signals may take, a tabular listing of a number of different patterns according to which dots may be arranged in a pixel area to produce the tone value corresponding to the color image density signal of such integral value;

(c) randomly selecting a different one of said patterns from said tabular listing whenever a density signal of said one integral value appears, and (d) operating said ink-jet printing means to apply dots in the pattern randomly selected from said tabular listing onto the dot positions of the associated pixel area in the sequence of pixel areas to be printed, each of said dot positions comprising a pixel area being available to receive a dot and being printed when a corresponding dot comprising the random pattern is to be printed in the dot position, wherein the pattern of an immediately adjacent advance pixel area is randomly selected from the tabular listing and the pattern of an immediately adjacent trailing pixel are in the sequence is randomly selected from the tabular listing, each of said immediately adjacent pixel areas in a sequence of pixel areas for a given integral value being printed with a different randomly selected pattern.

10. A method for controlling an ink-jet printing means as defined in claim 9 further characterized by the step of printing at least one other color by randomly selecting a different one of said patterns from said tabular listing for each of the pixel areas to be printed whenever a density signal of said one integral value appears for said other color.

* * * * *